United States Patent Office 2,907,627
Patented Oct. 6, 1959

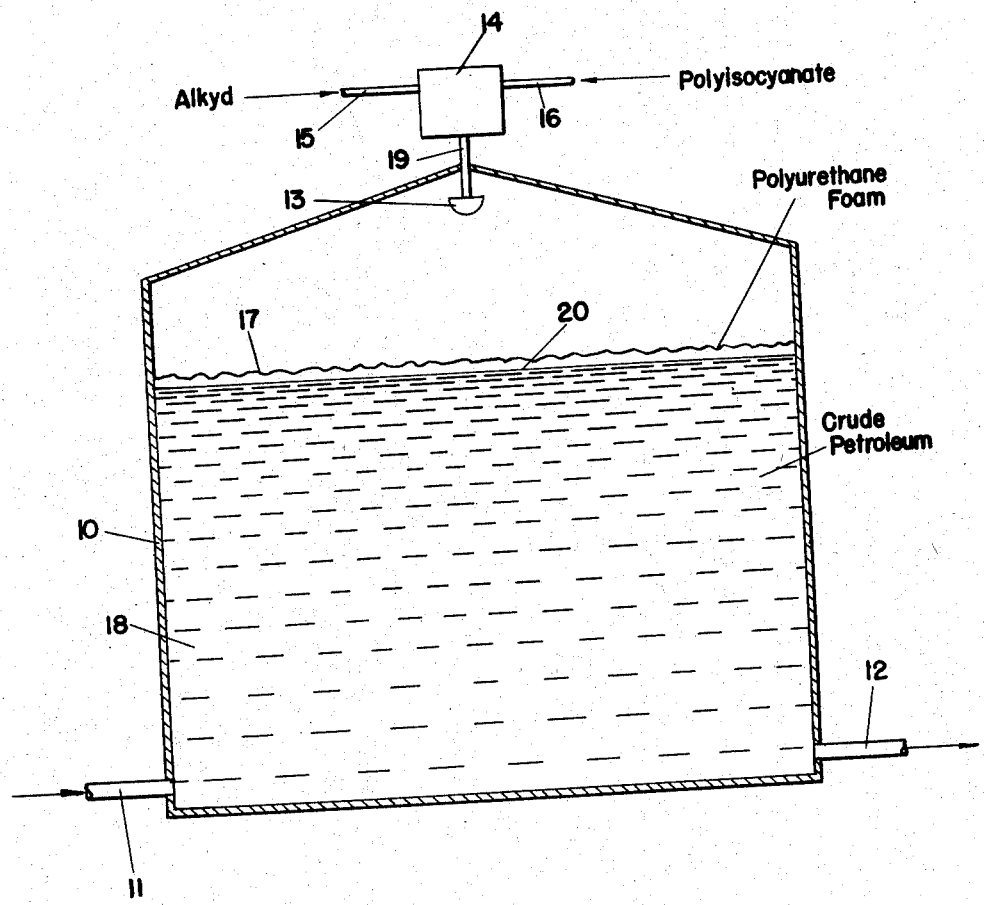

2,907,627
INHIBITING VAPOR LOSS FROM LIQUIDS

Leland W. T. Cummings, Wyncote, Pa., assignor to Sun Oil Company, Philadelphia, Pa., a corporation of New Jersey Application February 19, 1957, Serial No. 641,219

6 Claims. (Cl. 21—60.5)

This invention relates to the preparation and use of a covering agent for bodies of volatile liquids.

In the storing of volatile liquids, a serious problem is presented by the loss of material by vaporization. Volatile liquids, in the sense in which the term is used here, include materials such as crude mineral oil, which are ordinarily not thought of as being particularly volatile, but which are in fact sufficiently volatile to undergo vaporization of very substantial amounts of oil during storage in oil tanks, e.g. cone-roof tanks, open tanks, etc. Floating steel roof tanks are used to reduce evaporation losses from volatile liquids. However, such tanks have disadvantages, as recognized in the art, and it would be preferable to employ cone-roof tanks for example if the problem of evaporation loss could be satisfactorily solved.

It has also been proposed previously to employ layers of discrete, finely divided solid particles, to act as a barrier to the evolution of vapors from the surface of the liquid. One type of material which has been proposed for use in this manner comprises spheres of phenolic resin containing nitrogen gas at atmospheric pressure therewithin, the average particle size of the spheres being for example about 0.0013 inch. Such spheres have been found to be effective in reducing the loss of material by vaporization, but are subject to the disadvantage of contaminating the body of liquid with the solid particles, as a result of individual particles sinking from the covering layer during the storage period, or of all or part of the layer being withdrawn with the liquid when the latter is removed from the storage tank. Also, these materials are subject to the disadvantage that they may collapse under elevated pressure and lose their buoyant properties.

The present invention provides highly satisfactory inhibition of vapor loss from bodies of volatile liquid while avoiding the disadvantages of the prior art. The process according to the invention involves forming foam from plastic materials or from materials reactive to form plastics, and spreading the foam on the surface of the body of volatile liquid. The foam is then cured or set to form a cohesive cellular layer. The layer of foam initially spread on the surface, and the solid layer formed upon curing of the foam are both lighter than the liquid, and float on the surface thereof. The solid cured layer provides effective inhibition of vapor loss, and because of its unitary solid structure, there is no substantial contamination of the liquid, the covering material remaining permanently in the solid layer.

Many foams which are capable of curing to form cohesive, rigid or flexible, unitary solid masses are known as such in the art. The gaseous material by which the foam is produced is in some instances evolved in the same reaction which produces the plastic material; thus, carbon dioxide is evolved in some instances. The gas in other instances is evolved from a "blowing agent" which is added to the reactants for the specific purpose of decomposing to produce a gas, e.g. carbon dioxide or nitrogen. In still other instances, the gas is introduced as such from an external source. The blowing of the plastic material to form a foam is in some instances accompanied by increased temperature or reduced pressure or both to promote the bubbling of gas through the plastic material.

The curing of the foam to form a cellular solid layer is accomplished in some instances by the application of heat from an external source, and in other instances by heat evolved in the reactions which produce the plastic material. In other instances, the curing is brought about catalytically, as for example in the case of a tertiary amine catalyst for use with polyurethane foam. In still other instances, the curing occurs spontaneously without external heat or catalysis.

Any suitable material for producing plastic foams can be employed according to the invention, though foams having certain characteristics as subsequently discussed are preferred. For the general purpose of the invention, the physical characteristics, rather than the chemical structure, of the materials employed, are the controlling features. In the light of the present specification, a person skilled in the art can select suitable materials to provide the desired characteristics.

The well known polyurethane plastic foams prepared from polyisocyanates and polyhydroxy compounds such as alkyd resins have superior qualities which make them preferred materials for use according to the invention. Examples of reagents for producing polyurethanes are given in "Industrial and Engineering Chemistry," volume 46, pages 1498 to 1503 (1954), and in United States Patent No. 2,634,244, issued April 7, 1953, to Eli Simon et al. Various types of polyurethane foams are disclosed in "Product Engineering," February 1955, pages 140 to 143. Other known materials for formation of plastic foams can also be employed, such as the well known phenolic resins, epoxy resins, and others. Various types of plastic foams suitable for forming cellular solid materials are disclosed in "Chemical and Engineering News" for May 21, 1956, at pages 2492 to 2498.

If desired, flame retarding materials can be incorporated in the plastic foam, in order to provide a cellular solid layer which has improved fire resistant properties. Various materials which can be employed as flame retarders are disclosed in United States Patent No. 2,634,244 issued April 7, 1953, to Eli Simon et al.

The covering agent according to the invention can be used to inhibit vaporization from any volatile liquid, e.g. water, organic liquids such as benzene, acetone and others, mineral oils, etc. It is particularly advantageous to inhibit vaporization from crude petroleum or volatile fractions thereof, e.g. gasoline.

The invention will be further described with reference to the attached drawing, which schematically illustrates a cone-roof storage tank for crude petroleum, and means for providing a covering agent according to the invention for inhibiting vapor loss from a body of crude petroleum in the tank.

In the drawing, storage tank 10 contains a body of crude petroleum 18. Lines 11 and 12 are provided for introduction and removal of additional crude into and from the tank as desired. A spray nozzle 13 of suitable design is provided at the apex of the tank. A mixing vessel 14 communicates with nozzle 13 by means of conduit 19. Conduits 15 and 16 communicate with vessel 14 and are adapted for the introduction thereinto of materials reactive to form plastic foam.

In operation, tank 10 is filled to a level about one foot, for example, above the indicated level 20 in the drawing. By removal of oil through line 12, the upper surface of the body of crude is lowered to the indicated level 20, thereby to leave a film of oil on the sides of the vessel, the film extending about one foot above the level 20.

A liquid alkyd resin, prepared for example by condensation of glycerol with adipic acid, is introduced through line 15 into vessel 14, and a suitable polyisocyanate such as 2,4-tolylene diisocyanate is simultaneously introduced through line 16. The alkyd resin and the diisocyanate react in vessel 14 to form a polyurethane foam, which is passed through line 19 into spray nozzle 13. The foam is discharged from nozzle 13 onto the upper surface 20 of the body of crude, the nozzle being so designed that the foam is distributed over the entire surface of the body of crude to provide a layer about three inches thick for example. It is to be understood that a plurality of spray nozzles distributed over the horizontal cross section of tank 10 can be employed if desired to improve the uniformity of the layer of foam spread on the surface 20 of the body of crude. A nozzle or nozzles which are movable so as to spray in various directions can be employed. The foam layer cures in a matter of minutes to form a cohesive cellular solid layer, which effectively inhibits vaporization of hydrocarbon materials from the body of crude.

Because of the film of oil present on the sides of the tank at the time of spreading of the foam over the surface 20, the foam which impinges upon the side walls does not adhere thereto, and the cellular solid layer 17 which is formed upon curing of foam is therefore capable of moving vertically within the tank 10 upon an increase or decrease of the depth of the body of liquid within the tank.

The cellular solid layer can be left in the tank indefinitely, since it is quite permanent and not subject to loss of material therefrom as in the case of layers of discrete solid particles, or in the case of a liquid foam. Although various liquid foams have been proposed previously as being quite stable, such foams do not have the permanence of the cellular solid layers employed according to the invention.

The cellular solid layer has the advantage that the liquid can be completely withdrawn from the tank without danger of contaminating the liquid by the covering agent. During the period when the tank is empty, the cellular solid layer remains at a suitable level in the lower part of the tank above the oil inlet line, and upon introduction of additional oil through that line is elevated to the level of the upper surface of the body of liquid thereby formed.

The following examples illustrate the invention:

*Example I*

Operation as described in connection with the drawing is carried out. The alkyd resin has acid number of 10 and contains about 1.5 percent water, and is prepared by reacting 4 moles of trimethylol propane, 2½ moles of adipic acid, and ½ mole of phthalic anhydride. The polyisocyanate is 2,4-tolylene diisocyanate. The volume ratio of alkyd to polyisocyanate is 1.2:1. The materials react to form a polyurethane resin foam. The foam is sprayed at ambient temperature onto the surface of the oil in the tank. The foam floats on the surface and sets in a matter of minutes to form a cohesive, cellular plastic layer which inhibits vaporization of hydrocarbons from the body of the crude.

*Example II*

Instead of forming a polyurethane adduct at essentially the same time that the foam is produced, as in Example I, a preformed adduct is made in the present example, introduced through line 15 and admixed with water and amine catalyst introduced through line 16 to provide reaction of the adduct with water to produce further condensation and liberate carbon dioxide which blows the resulting resin into a foam. The preformed adduct is obtained by reaction of 2,4-tolylene diisocyanate and a mixture of polyethylene glycols having average molecular weight of about 400. The amine catalyst is N-methyl morpholine. The proportions of reactants are about one part by weight of catalyst and 3 parts of water per 100 parts of preformed adduct. The results are generally similar to those obtained in Example I.

*Example III*

The foam in this example is produced by introducing a mixture of phenolic resin and a polyethoxylated octadecyl phenol surfactant through line 15, hydrogen peroxide through line 16, and phenol sulfonic acid through means not shown, into zone 14. This manner of producing foam is disclosed in United States Patent No. 2,653,139 issued September 22, 1953, to Robert F. Sterling. No external heat is required to produce the foam. The manner of operation is generally similar to that involved in Example I, and generally similar results are obtained.

It is preferred according to the invention to provide a unicellular solid covering layer. Unicellular plastic solids are those plastic solids wherein the cells are not interconnecting. Such solids provide more effective inhibition of vapor loss than those which have interconnecting cells, since vapor cannot penetrate the solid layer by way of the cell structure unless the cells are interconnected. When the cells are interconnected, an effective barrier to vapor loss is provided, but not as effective as in the preferred embodiment. The formation of unicellular and other types of plastic foamed solids is known in the art, and a person skilled in the art can, in the light of the present specification, provide materials which form the desired type of plastic foamed solids. The use of plastic foamed solids containing connecting cells is within the scope of the invention; however, it is preferred that the solids have unicellular structure.

The foam which is applied to the surface of a body of liquid, in the process according to the invention, preferably cures without the application of external heat. However, it is within the scope of the invention to apply external heat if necessary. Thus, for example, the foam can be heated in a vessel external to the storage vessel, prior to applying the foam to the surface of the body of liquid. In some instances, such heating may not be sufficient to provide the desired curing, in which case it is within the scope of the invention to heat the body of liquid, onto the surface of which the foam is sprayed. In some instances, where the liquid which is to be protected from vapor loss is too volatile to permit heating sufficiently to form the cured foam, the plastic foamed solid can first be formed on the surface of a less volatile liquid, e.g. a distillation residue obtained in petroleum refining. The less volatile material can then be removed from the storage zone and replaced by the more volatile material.

In the preceding description of the drawing, the application of the foam to the surface of the body of liquid by spraying was disclosed. It is to be understood however that any other suitable means of application of foam can be employed. Thus for example it is within the scope of the invention to mix the foam and the liquid to be covered prior to introduction of the latter into the storage zone, the foam rising to the surface of the body of liquid following the introduction. However, the application of the foam by spraying from above, as disclosed previously, is the preferred manner of applying the foam. A spray nozzle, if employed, need not be a fixed installation. If desired, a nozzle or nozzles can be inserted temporarily through manholes and removed after the spraying operation.

In the method according to the invention, the plastic foamed solid material which is employed to inhibit vaporization, is shaped while in fluid form, by contact with the vessel wall and any obstructions in the vessel, and then cured to provide a solid material having suitable shape. This manner of operation provides particularly beneficial results in that the covering layer conforms well to the interior of the storage vessel and fits well around any obstruction which may be present in the vessel. Furthermore, the installation of the covering layer is more satisfactorily and readily performed in this method than in the case where the covering layer is shaped while in the solid state.

A wide variety of densities is available in plastic foamed solids, and material having any suitable density can be employed according to the invention. The solid material must be sufficiently light so that it is capable of floating on the liquid involved. A suitable density, less than that of the liquid involved, can be chosen by a person skilled in the art in the light of the present specification. Preferably, the density of the solid material is not substantially greater than 10 pounds per cubic foot, more preferably not substantially greater than 5 pounds per cubic foot. The relatively light solid materials provide better insulation of liquid from heat than is obtained with heavier covering layers.

The covering layer employed according to the invention is preferably flexible, though rigid plastic foamed solids can also be employed. The suitable conditions for obtaining either flexible or rigid plastic foamed solids are well known in the art.

The plastic layer should be resistant to attack by the liquid which is covered. Suitable materials and methods for preparing cellular plastics which are resistant to various liquids are known in the art, and a person skilled in the art can select, in the light of the present specification, suitable materials and methods for a given liquid.

Any suitable manner of eliminating adhesion of the plastic foam to the vessel wall and other surfaces in the vessel can be employed. Any suitable coating or lining material can be employed at such surfaces to prevent adhesion. Alternatively, the contact of the foam with such surfaces can be avoided in the application of the foam to the liquid surface. Any other suitable means can be employed to prevent or eliminate adhesion of the foam to the surfaces. In the light of the present specification, a person skilled in the art can select suitable means for avoiding adhesion in a given instance.

The invention claimed is:

1. Process for inhibiting vapor loss from a body of volatile liquid which comprises: spreading synthetic resinous plastic foam over the surface of a body of volatile liquid, inert to said foam, in a storage zone; and curing the foam to form a cellular, cohesive layer which inhibits vapor loss from the liquid, said foam during said curing being out of adhesive contact with stationary solid surfaces in said zone at the level of said layer, said layer subsequently moving vertically in said storage zone with changes in the level of the supporting surface of said body of volatile liquid.

2. Process according to claim 1 wherein said layer comprises a polyurethane plastic.

3. Process according to claim 1 wherein said foam is formed by admixing a preformed polymer of an arylene diisocyanate and a polyester having a plurality of hydroxyl groups, with an aqueous solution of a tertiary amine catalyst which promotes reaction of the preformed polymer with water to liberate carbon dioxide.

4. A body of volatile liquid contained in a storage zone and having upon the surface thereof a layer of a cellular, unitary, solid material formed by curing in situ a foam comprising synthetic resinous plastic material, said layer being out of adhesive contact with stationary solid surfaces in said zone at the level of said layer.

5. Process according to claim 1 wherein said foam comprises a reaction product of a tolylene diisocyanate and a polyalkylene glycol.

6. Process for inhibiting vapor loss from a body of volatile liquid which comprises: spreading synthetic resinous plastic foam over the surface of a body of volatile liquid, inert to said foam, in a storage zone, in the presence of a film of said liquid on stationary solid surfaces in said storage zone at a level directly above the surface of said body, said film having been previously produced by removing liquid from said body, thereby to lower the level of the surface of said body; and curing the foam to form a cellular, cohesive layer which inhibits vapor loss from the liquid, said foam during said curing being separated by said film from stationary solid surfaces in said zone at the level of said layer, said layer subsequently moving vertically in said storage zone with changes in the level of the supporting surface of said body of volatile liquid.

References Cited in the file of this patent

UNITED STATES PATENTS

| | | |
|---|---|---|
| 1,415,351 | Howard | Mar. 9, 1922 |
| 2,634,244 | Simon | Apr. 7, 1953 |